Figure 1:
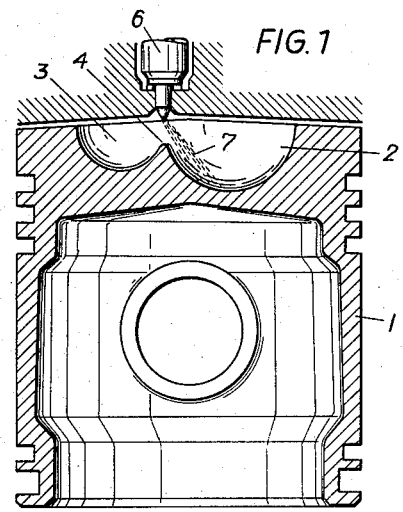

Aug. 11, 1964     H. LIST     3,144,008
INTERNAL COMBUSTION ENGINE WITH COMPRESSION IGNITION
Filed Dec. 22, 1961

Inventor
Hans List
By
Watson, Cole, Grindle & Watson
Attys.

United States Patent Office 3,144,008
Patented Aug. 11, 1964

3,144,008
INTERNAL COMBUSTION ENGINE WITH
COMPRESSION IGNITION
Hans List, 126 Heinrichstrasse, Graz, Austria
Filed Dec. 22, 1961, Ser. No. 161,507
4 Claims. (Cl. 123—32)

The invention relates to an internal combustion engine with compression ignition, comprising recesses in the form of solids of revolution in the piston, said recesses taking up most of the compressed air prior to the combustion and communicating with each other through intermediate steps or intermediate reductions, the fuel being injected into said recesses by means of a multi-hole nozzle. Similar combustion engines are already known, the recesses being of identical size and shape, the relative position of fuel jets in these recesses being the same. It is also known to impart a rotary motion around the cylinder axis to the air for combustion already at the time when it enters the cylinder, as a result of which the compressed air in the recesses maintains its rotary motion in the same direction, the rate of rotation being at least approximately the same in all recesses.

Due to the fact that identical conditions prevail in the recesses, in this type of internal combustion engines, the course of combustion in the said recesses will be the same, as a result of which the fuel particles burnt in each chamber per unit of time are multiplied. It is therefore, difficult to control the course of combustion.

The invention, however, deliberately aims at different courses of combustion in each of the combustion chambers, thereby increasing the possibilities of controlling the course of combustion. According to the invention, this aim is attained by diversifying in the individual recesses in the form of solids of revolution at least one of the characteristics determining the course of combustion in said recesses and pertaining to the size, shape and location of the recesses in the form of solids of revolution, the movement of the air and the relative position of the fuel jets in the said recesses.

By appropriately applying these measures it is possible to control the course of combustion in the various recesses, since as a result, the igntion lags and consequently, the courses of combustion differ from each other.

Consequently, the overall combustion can be controlled in such a manner that different requirements, such as for example, with regard to the smoothness of operation, efficiency and maximum pressure, can be met to a considerable extent.

Thus the invention differs fundamentally also from the known suggestion according to which in addition to the main combustion chamber provided in the piston head in a manner known per se, an additional combustion chamber of a lesser volume is provided in the cylinder cover. Since the latter serves as the origin of the ignition of the injected fuel, it must be so designed as to keep the dissipation of heat therefrom as low as possible. This arrangement had been recommended for internal combustion engines where a large portion of the injected fuel is sprayed on to the wall of the combustion chamber, since in this case starting is difficult. As compared with this suggestion, the effect achieved by the application of the basic idea of the present invention is much more far-reaching. This is borne out by the fact that according to the invention it is possible to extend the control of combustion over its entire course.

For example, the relative position of the fuel jets in the various combustion chambers or the pattern of jet in the latter may, within the scope of the invention, be different while the size and shape of the recesses in the form of solids of revolution remains the same and the movement of the air in the latter is identical. On the other hand, the movement of the air in individual recesses may differ, for example, due to the different directions of the intake ducts leading to the recesses, whereas the fuel jets are identical in shape and in their position relative to the said recesses. Besides, it is possible to design the various recesses of different sizes and to inject jets of varying amounts into them, the position of the jets in relation to the recesses being either identical or different, as the case may be. If in this instance, for example, the combustion is first initiated in the smallest recess, it is possible to achieve a rather smooth course of combustion. If the recesses are of different size, a further advantage can be derived from the possibility of arranging the nozzles outside the section of the metal land between the valve seats subject to the greatest thermal stress, as a result of which the risk of cracking of the cylinder head is greatly diminished.

According to another feature of the invention the delivery of the various fuel jets should be at least approximately proportional to the volume of the corresponding recess. It is obviously also possible, within the scope of the invention, to depart from a uniform air-fuel ratio for the various recesses, thereby also causing or controlling an unequal course of combustion.

Figure 3:
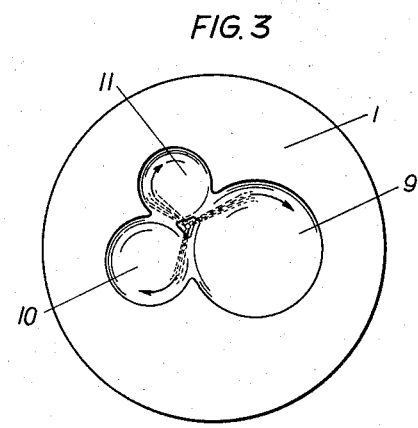
Figure 2:
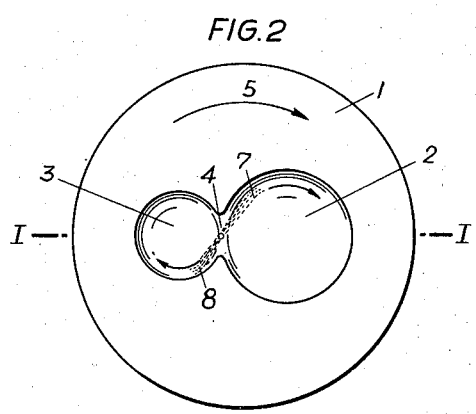
Figure 4:
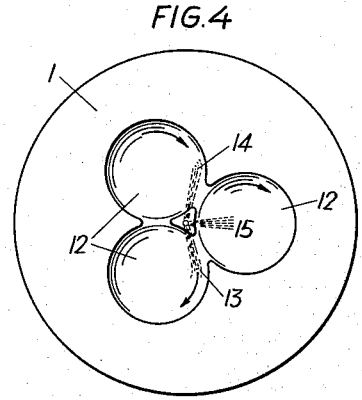

Further details of the invention will appear from the following description of several embodiments of the invention with reference to the accompanying drawing in which FIGURE 1 of the schematic drawing shows an embodiment of the invention in section on line I—I of FIGURE 2, FIGURE 2 shows a plan view of the piston relative thereto, FIGURES 3 and 4 each show a different embodiment of the invention in the same view as FIGURE 2.

In the embodiment shown in FIGURES 1 and 2, the dome-shaped recesses 2 and 3 are provided in the piston 1, both located at approximately the same distance from the periphery of the piston and defining a web 4. The arrow 5 in FIGURE 2 indicates that a rotary motion has been imparted to the air for combustion already prior to its entry into the recesses 2, 3, said rotary motion continuing in the recesses 2, 3 in the same direction as illustrated by the arrows shown therein. By means of a multi-hole nozzle 6 a jet 7 is injected into the recess 2 and a jet 8, preferably of a lesser amount, into the recess 3, each in the direction of the rotary motion of the air for combustion and approximately in tangential relation thereto. Consequently, the diversity of the course of combustion is obtained in this instance by the difference in size between the recesses 2 and 3.

Similar conditions prevail in the embodiment illustrated in FIGURE 3, the difference consisting in the provision of three recesses 9, 10, 11, each of different size. The fuel is also injected in the direction of the movement of the air.

In the embodiment shown in FIGURE 4, three recesses 12 of identical size are provided, the fuel jet 13 being injected into the recess in the direction of the movement of the air, whereas the fuel jet 14 is injected in the opposite direction, and the fuel jet 15 in a direction neutral to the aforesaid directions, approximately in radial relation thereto. In that case, the desired diversity of the course of combustion in the various recesses is achieved by different mixtures, the amount of fuel in the jets 13, 14 and 15 being preferably the same.

I claim:
1. An internal combustion engine of the liquid fuel injection compression type, comprising a piston, a cylinder and a cylinder head, at least two recesses of essentially different sizes between the cylinder and cylinder head in the form of rotary members to take up for the most part, the compressed air at the end of each compression stroke, whereby the combustion air before entry into the said recesses are subjected to a rotary motion, and a fuel injection nozzle in the cylinder head to inject the fuel by individual jets into said recesses with means to alter at times the progress of combustion in the recesses.

2. An internal combustion engine according to claim 1, in which the recesses are provided in the piston.

3. An internal combustion engine according to claim 1, wherein an unequal combustion in the recesses are attained by the different positions of the fuel injection jets relative to the air movements attained in the individual recesses.

4. An internal combustion engine according to claim 1, wherein the recesses are of similar shape and the amount injected fuel in the recesses is approximately proportional to the volume of the individual recesses.

References Cited in the file of this patent

UNITED STATES PATENTS

| | | |
|---|---|---|
| 2,881,743 | Holt | Apr. 14, 1959 |
| 2,898,894 | Holt | Aug. 11, 1959 |

FOREIGN PATENTS

| | | |
|---|---|---|
| 833,683 | Great Britain | Apr. 27, 1960 |
| 833,684 | Great Britain | Apr. 27, 1960 |